United States Patent [19]

Balterman

[11] Patent Number: 5,133,568
[45] Date of Patent: Jul. 28, 1992

[54] U-LOCK CONNECTOR FOR BICYCLE HANDLEBAR

[76] Inventor: Alisa M. Balterman, 3724 Park Ave. South, Minneapolis, Minn. 55407

[21] Appl. No.: 762,622

[22] Filed: Sep. 19, 1991

[51] Int. Cl.⁵ .................. B62J 11/00; B62K 21/12
[52] U.S. Cl. ..................... 280/288.4; 224/30 A; 248/229; 74/551.8
[58] Field of Search .......... 280/288.4, 281.1, 304.5; 224/30 R, 30 A, 41; 248/229, 231.6; 74/551.1, 551.3, 551.7, 551.8, 551.9; 70/233

[56] References Cited

U.S. PATENT DOCUMENTS

| | | | |
|---|---|---|---|
| 1,629,859 | 5/1927 | Burke | 224/30 R |
| 3,289,493 | 1/1965 | Church | 74/551.8 |
| 3,924,426 | 12/1975 | Zane et al. | 70/18 |
| 3,948,424 | 4/1976 | Hunn et al. | 224/41 |
| 3,967,475 | 7/1976 | Zane | 70/18 |
| 4,155,231 | 5/1979 | Zane et al. | 70/18 |
| 4,256,322 | 3/1981 | Otsuka et al. | 224/31 |
| 4,271,690 | 6/1981 | Jaulmes | 70/233 |
| 4,436,232 | 3/1984 | Zane et al. | 224/39 |
| 4,445,396 | 5/1984 | Shimano | 74/551.9 X |
| 4,545,224 | 10/1985 | Zane | 70/39 |
| 4,730,470 | 3/1988 | Zane et al. | 70/238 |
| 4,736,921 | 4/1988 | Zane et al. | 248/316.2 |
| 4,817,833 | 4/1989 | Rebera | 224/36 |
| 4,819,217 | 4/1989 | Houlihan | 224/30 A X |
| 4,873,886 | 10/1989 | Renner | 74/551.8 |
| 5,010,746 | 4/1991 | Zane et al. | 70/39 |

OTHER PUBLICATIONS

Bicycling Magazine, Apr. 1991, p. 73, (Showing Schwinn U-Lock).
Bicycling Magazine, Apr. 1991, p. 149, (Showing Racing Handlebars).
Performance Bicycle Shop Catalog, Summer 1991, pp. 44, 45 (Showing Clip on Handlebars).

Primary Examiner—Charles A. Marmor
Assistant Examiner—Kevin Hurley
Attorney, Agent, or Firm—Palmatier & Sjquist

[57] ABSTRACT

A connector for mounting a U-lock on the handlebar of a bicycle so that a bicyclist may steer the bicycle via the U-lock. Such an orientation of the U-lock further permits the bicyclist to maintain a forward leaning racing position to gain more power for pedaling. The connector includes a quick release means so that the U-lock is readily available for its conventional purpose of locking the bicycle to an object.

22 Claims, 2 Drawing Sheets

U-LOCK CONNECTOR FOR BICYCLE HANDLEBAR

BACKGROUND OF THE INVENTION

The present invention relates to U-locks and bicycle handlebars and, more particularly, to the combination of a U-lock mounted on a bicycle handlebar so that the bicycle may be steered with the U-lock.

A professional bicycle racer may utilize a U-shaped handlebar which extends a considerable distance over the front wheel of the bicycle. With such a U-shaped handlebar, the racer may assert a forward leaning, almost prone position which provides more power to the legs for pumping the pedals.

A bicycle U-lock is a lock having a U-shaped shackle and a cross bar. The U-shaped shackle includes a pair of ends which engage the cross bar. One of the ends of the U-shaped shackle is typically disengagable from the cross bar when the U-lock is unlocked to permit the other end to pivot relative to the cross bar to provide an opening to the U-shaped shackle such that the shackle may receive a portion of the bicycle frame and a stationary object such a bike rack. One of the more popular U-locks is the KRYPTO LOK ® or KRYPTONITE ® bicycle lock of the Kryptonite Corp. of Massachusetts.

SUMMARY OF THE INVENTION

An object of the present invention is to provide means for rigidly connecting a U-lock to the handlebar of a bicycle so that the U-lock may be used to steer the bicycle.

A feature of the present invention is the provision in a connector for connecting a U-lock to the handlebar of a bicycle, of quick release means for quickly securing and releasing the U-lock relative to the handlebar.

Another feature is the provision in such a connector, of tensioning means for maximizing a rigid connection between the U-lock and the connector.

Another feature is the provision in such a connector, of means for engaging both the U-shaped shackle and the cross bar to minimize pitch, roll, or yaw-type slippage of the U-lock relative to the handlebar.

Another feature is the provision in such a connector, of shock absorbing means between the connector and the handlebar.

Another feature is the provision in such a connector, of shock absorbing means between the connector and the U-lock.

An advantage of the present invention is that a U-lock, which is conventionally transported on a bicycle in a nonfunctional position, is carried on the bicycle in a functional position as a handlebar.

Another advantage is that the U-lock is connectable to the handlebar of a bicycle without adding significant weight to the bicycle.

Another advantage is that a conventional bicycle handlebar is readily convertible to a racing-type handlebar. Accordingly, such a conversion permits the bicyclist to assume a greater variety of positions on a bicycle, including a more aerodynamic, forward leaning position.

Another advantage is that the present connector is simple and inexpensive to manufacture.

Another advantage is that the present connector is simple to operate.

DETAILED DESCRIPTION OF THE PREFERRED EMBODIMENTS

Figure 1:
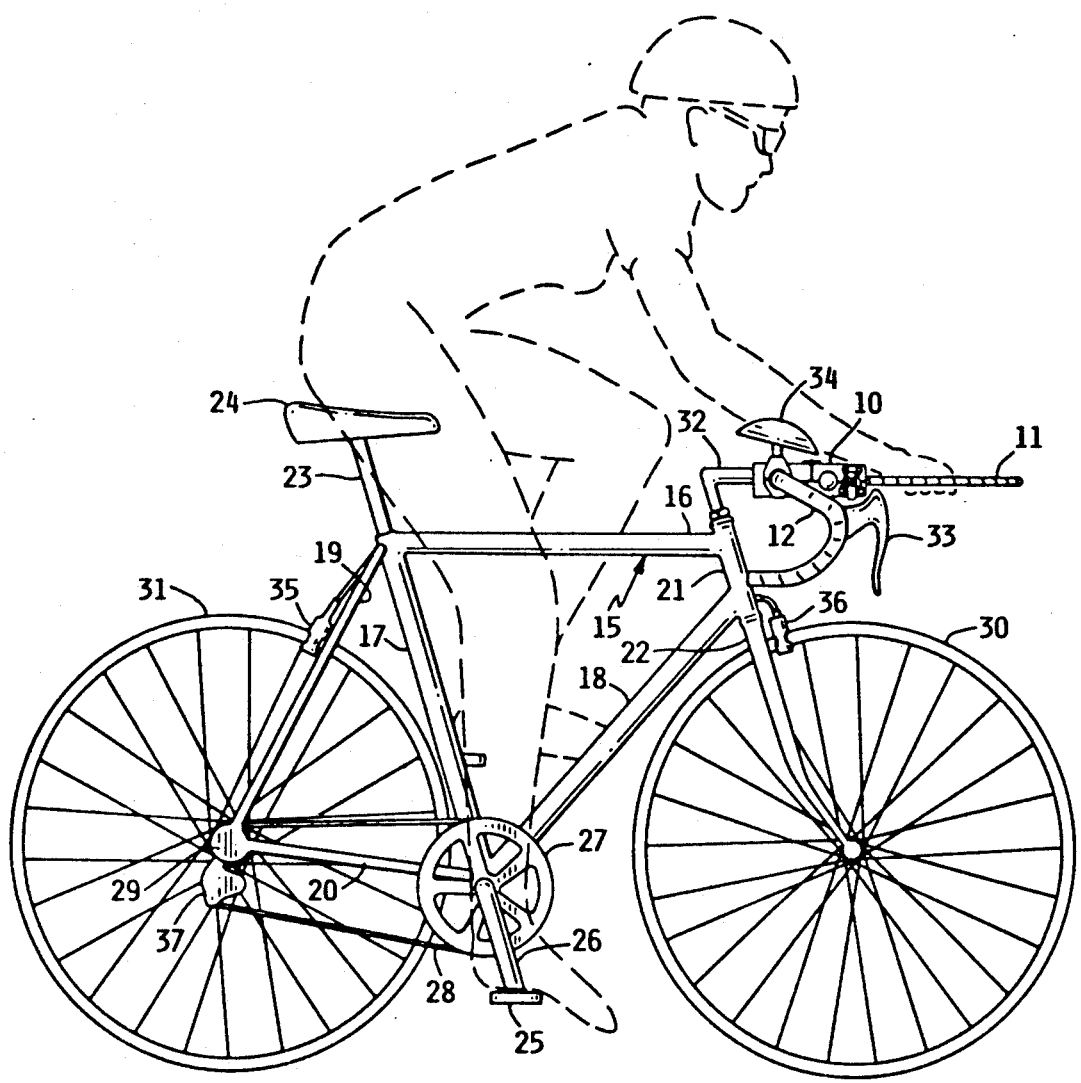
FIG. 1 is a side elevation view of the present connector affixed between a bicycle handlebar and a U-lock, and also shows a bicyclist manipulating the U-lock to steer the bicycle.

As shown in FIG. 1, the present connector is indicated in general by the reference numeral 10 and is affixed to and between a U-lock 11 and a bicycle handlebar 12 of a bicycle 13 to permit the U-lock 11 to function as another bicycle handlebar.

The bicycle 13 includes a frame 15 having a top tube 16, a seat tube 17, a down tube 18, seat stays 19, chain stays 20, a head tube 21, and a fork 22. The bicycle 13 further includes a seat post 23, a saddle 24, power means including pedals 25, a crank 26, a chain wheel or sprocket 27, chain 28, and freewheel 29, respective front and rear wheels 30, 31, a stem or handlebar portion 32, a brake lever 33, a pair of armrests 34 affixed to the handlebar 12 or cross bar or shackle of the U-lock 11 if desired, a rear brake 35, a front brake 36, and a rear derailleur 37.

Figure 2:
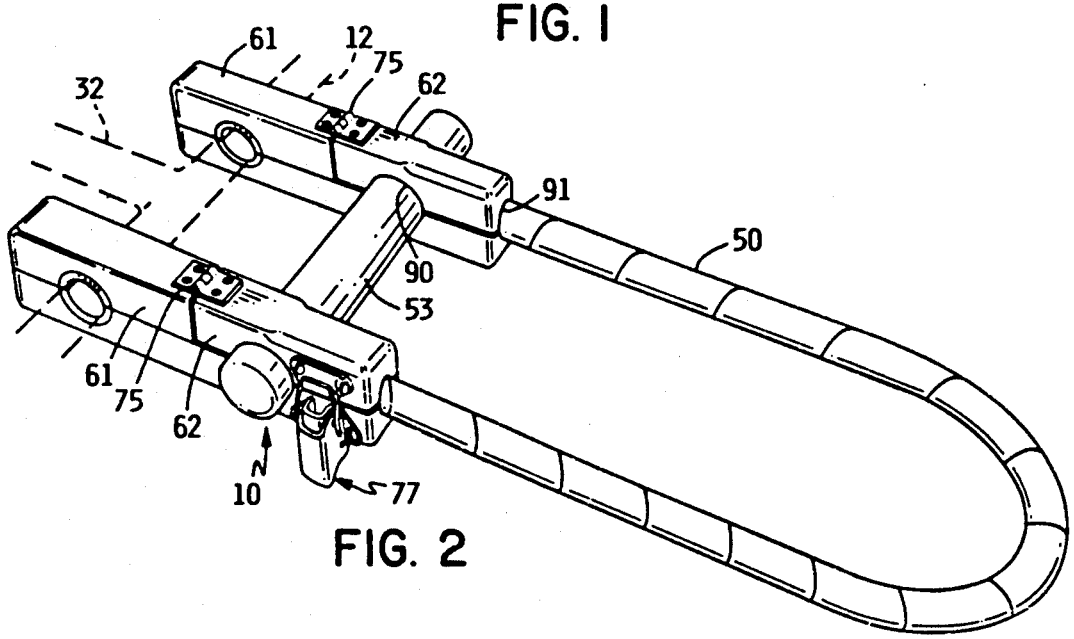
FIG. 2 is a detail, perspective view of the connector of FIG. 1 fixed to and between a U-lock and a bicycle handlebar, which is shown in phantom.
Figure 3:
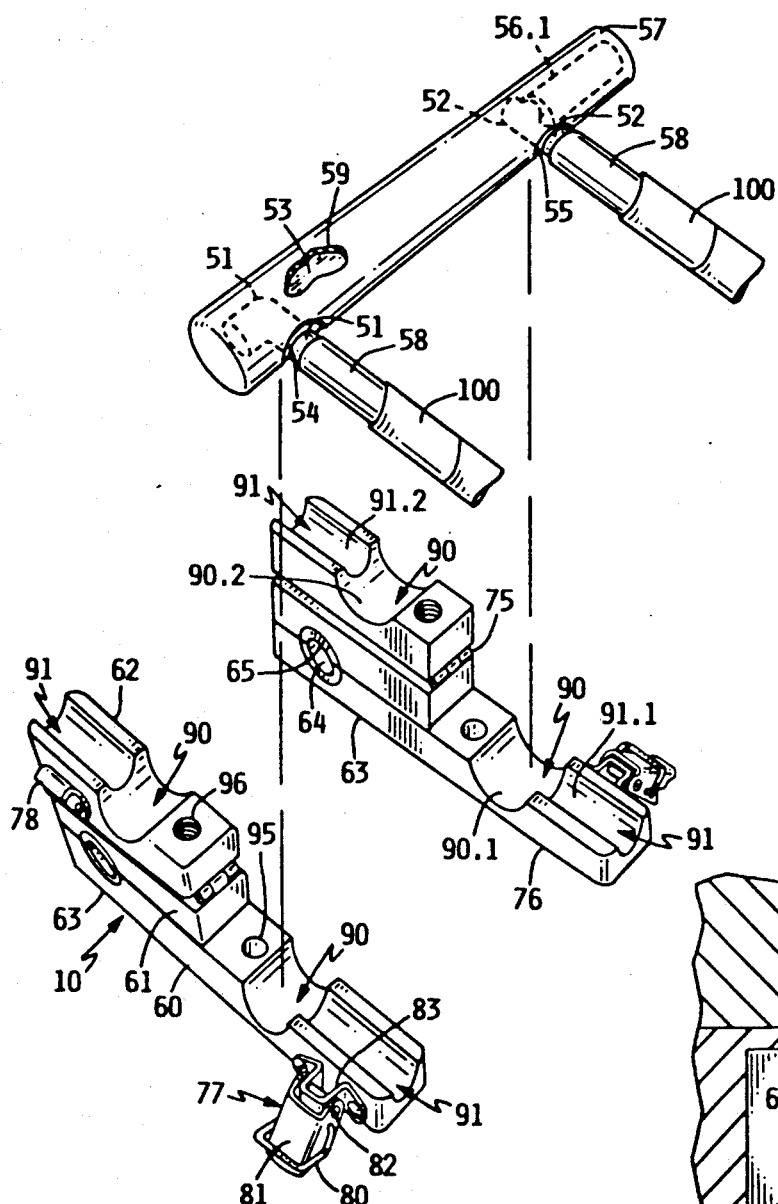
FIG. 3 is a detail, perspective view of the connector of FIG. 1 in an open position.
Figure 5:
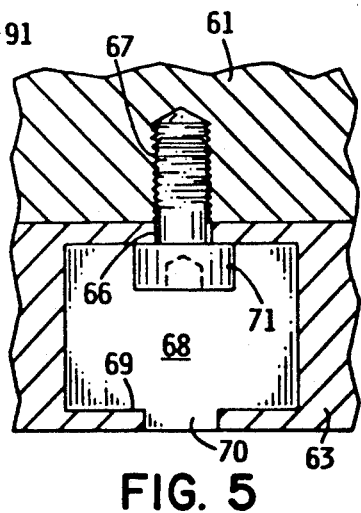
FIG. 5 shows a detail partial view of the connector of FIG. 1.
Figure 4:
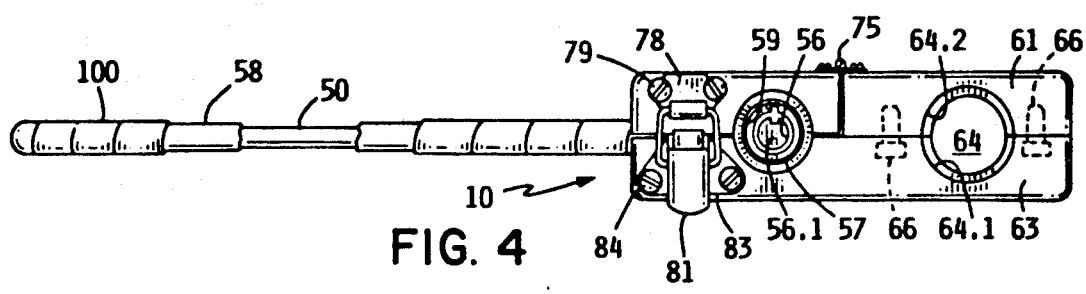
FIG. 4 is a detail, side elevation view of the connector of FIG. 1 in a closed position for rigidly engaging the U-lock.

As shown in FIGS. 2-4, the U-lock 11 includes a U-shaped rigid shackle 50 with a pair of ends 51, 52. The ends 51, 52 are engagable with a locking tubular rigid cross bar 53. The cross bar 53 includes a pair of shackle end receptacles 54, 55 for receiving each of the ends 51, 52, respectively. The cross bar 53 further includes a keyhole 56 and lock means 56.1 generally axially disposed in one end portion 57 of the cross bar 53. Shackle end 52 lockingly engages lock means 56.1. Shackle end 51 swingably engages cross bar 53 and is typically partially hook-like in shape. When the shackle end 52 is unlocked and separated from the cross bar 53, the shackle end 51 remains engaged in the cross bar 53 but is pivotable or swingable relative to the cross bar 53 to permit the shackle end 52 to swing away from the cross bar 53 to be inserted between portions of the bicycle 13 for locking the U-lock 11 to an object such as a bicycle rack. The shackle 50 further includes a plastic or plastic-like resilient protective skin 58. The cross bar 53 also includes a plastic or plastic-like resilient protective covering 59.

As to the structure and function of the U-lock 11 and its U-shaped shackle 50 and cross bar 51, and the locking relationship therebetween, U.S. Pat. No. 4,155,231 issued May 22, 1979 is hereby incorporated by reference.

As shown in FIGS. 2-4, the connector 10 includes an elongate clamp base 60 to which a fixed clamping portion 61 and a swingable clamping portion 62 are securable. An integral rear base half portion 63 and the fixed clamping portion 61 include respective cylindrical surfaces 64.1, 64.2, each of which forms a half portion of a hole 64 for receiving the handlebar 12 therein. A plastic or Teflon or plastic-like lining or shock absorbing means 65 lines the respective cylindrical surfaces 64.1, 64.2. to minimize vibrations transmitted from the handlebar 12. The lining 65 may also accommodate slight variations in handlebar diameters.

The base portion 63 and fixed clamping portion 61 are fixed to each other and rigidly tightened to the handlebar 12 via a pair of pin connectors 66. Each of the pin connectors 66 includes a threaded portion 67 for engaging a threaded aperture in the fixed clamping portion 61. When loosened from portion 61, the pin connector 66 is held in a pocket 68 of the base portion 63 via a retaining lip 69, which forms a hole 70 of a smaller diameter than a head 71 of the pin connector 66. Hole 70 is of a sufficient diameter to permit a tool such as a screwdriver or Allen wrench to tighten pin connectors 66. The base portion 63, fixed clamping portion 61, and pin connectors 66 may be referred to as handlebar connection means.

The swingable clamping portion 62 is hingedly connected to the fixed clamping portion 61 via a hinge 75, which may be integral with portions 61, 62, or inlaid. The swingable clamping portion 62 is releasably and rigidly connectable to an integral half portion 76 of the base 60 via a quick release or tensioning or over-center connection mechanism 77. The connection mechanism 77 includes a hook 78 secured to clamping portion 62 via pin includes a rigid wire loop 80 engagable with the hook 78 and pivotably engaged with a finger lever 81. The finger lever 81 is in turn pivotally connected via a pivot pin 82 to a bracket 83 fixed to the base portion 76 via pin connectors 84. Since the portion of the rigid wire loop 80 which engages the finger lever 81 is offset from the pivot pin 82, the wire loop 80 draws the clamping portion 62 against the U-lock 11 and toward the base portion 76 in a tensioning fashion when the finger lever 81 is pushed toward the bracket 83. Conversely, the clamping portion 62 is quickly released by inserting a finger under the lever 81 and applying an upward force to release the wire loop 80 from the hook 78.

The base portion 76 and the clamping portion 62 each form a half portion of an aperture 90 for receiving and engaging the cross bar 53 of the U-lock 11. The base portion 76 and the clamping portion 62 also each form a half portion of an aperture 91 for receiving and engaging the shackle ends 51, 52 of the U-shaped shackle 50. The aperture 90 is formed by cylindrical surfaces 90.1, 90.2 of the portions 76, 62 respectively. Aperture 91 is formed by cylindrical surfaces 91.1, 91.2 of portion 76, 62, respectively. The apertures 90, 91 lead into each other at a right angle to reflect the right angle orientation between the shackle ends 51, 52 and the cross bar 53. When the cross bar 53 and ends 51, 52 are engaged in the apertures 90, 91, the protective skins 58, 59 of the shackle 50 and cross bar 53 act as shock absorbing means to absorb or minimize shocks or vibrations which may be transmitted from the handlebar 12, to the connector 10, to U-lock 11, or vice versa. The clamping portion 62, the base portion 76, and connection mechanism 77 may be referred to as the U-lock connection means.

It should be noted that cooperating pin connector holes 95, 96 formed in base portion 76 and clamping portion 62, respectively, may be utilized to receive a pin connector, similar to pin connector 66, to even more rigidly connect the clamping portion 62 to the base 60 and the U-lock 11 to the connector 10. Furthermore, the holes 90, 91 may include plastic or plastic-like linings or shock absorbing means identical to linings 65.

In operation, two of the connectors 10 are rigidly secured to the handlebar 12 by operating the pin connectors 66. The U-lock 11 is then rigidly secured to the connectors 10 by operation of the connection mechanism 77. When the U-lock 11 is connected, the cylindrical surfaces 91.1, 91.2 of the base portion 76 and clamping portion 62 engage the shackle 50 to prevent a pitch-like and yaw-like slippage of the U-lock 11 when a bicyclist leans on the shackle 50. The cylindrical surfaces 90.1, 90.2 of the base portion 76 and clamping portion 62 engage the cross bar 53 to prevent a roll-like and yaw slippage of the U-lock 11 such as when one side of the shackle 50 is being grasped or leaned upon or such as when a turning or steering force is being applied to the shackle 50.

It should be noted that the pin connectors 66 may be tightened sufficiently to prevent a pitch-like slippage of the connector 10 relative to the handlebar 12. However, if desired, a support bar may be extended between the base portion 63 and underneath the handlebar portion or stem 32 to ensure against a downward pitch-like slippage.

It should be further noted that the shackle 50 may be wound in spiral or helical fashion with a nonadhesive or adhesive bicycle tape 100 to provide a suitable grip for the bicyclist and to provide a handlebar-like appearance to the shackle 50. If desired, the cross bar 53 may also be wound with tape.

It should further be noted that the connector 10 is typically formed of aluminum. However, the connector 10 may be formed of fiberglass or plastic and be injection molded.

It should further be noted that the connector 10 may be permanently or integrally connected to the U-lock 11 such as integrally formed with the cross bar 53, or permanently or integrally attached to the handlebar 12. If integrally connected to the cross bar 53, the handlebar connection means may include quick release means, tensioning means, or a swinging clamp portion.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A connector for connecting a U-lock to a steering mechanism of a bicycle having a direction of travel, the steering mechanism having a handlebar with a central portion, the U-lock comprising a U-shaped shackle with a pair of ends, and a cross bar engagable with the ends of the U-shaped shackle, the connector comprising:
    a) handlebar connection means for rigid connection to the steering mechanism of the bicycle; and
    b) U-lock connection means attached to the handlebar connection means for rigid connection to the U-lock, the connection means mounting the cross bar generally perpendicular to the direction of travel of the bicycle and mounting the U-shaped shackle generally forwardly of the central portion of the handlebar whereby the U-lock is connectable to the steering mechanism to steer the bicycle.

2. The connector of claim 1, wherein the U-lock connection means comprises means for engaging both the U-shaped shackle and the cross bar.

3. The connector of claim 1, wherein the U-lock connection means comprises quick release means for quickly securing and releasing the U-lock to and from the connector.

4. The connector of claim 1, wherein the U-lock connection means comprises tensioning means for maximizing the rigidity of the connection between the connector and the U-lock.

5. The connector of claim 1, wherein the handlebar connection means comprises shock absorbing means for absorbing shocks between the handlebar and the connector.

6. The connector of claim 1, wherein the U-lock connection means comprises shock absorbing means for absorbing shocks between the connector and the U-lock.

7. The connector of claim 1, wherein the U-lock connection means comprises a clamp with a first aperture for engaging the cross bar and a second aperture for engaging one of the ends of the U-shaped shackle.

8. The connector of claim 7, wherein the apertures lead into each other.

9. A connector in combination with a U-lock for connecting the U-lock to a steering mechanism of a bicycle having a direction of travel, the combination comprising:
a) the U-lock, which comprises:
  1) a U-shaped shackle having a pair of ends; and
  2) a cross bar engagable with the ends of the U-shaped shackle; and
b) the connector, which comprises:
  1) bicycle connection means for rigid connection of the connector to the steering mechanism of the bicycle; and
  2) U-lock connection means attached to the bicycle connection means for rigid connection of the connector to the U-lock and having a transverse cylindrical groove for engaging the cross bar and a longitudinal cylindrical groove for engaging the U-shaped shackle, the transverse cylindrical groove being generally perpendicular to the direction of travel whereby the U-lock is connectable to the steering mechanism to steer the bicycle.

10. The combination of claim 9, wherein the grooves intersect for engaging portions of the cross bar and U-shaped shackle which engage one another.

11. The combination of claim 9, wherein the U-lock connection means comprises quick release means for quickly securing and releasing the U-lock to and from the connector.

12. A steering mechanism for a bicycle having a handlebar for steering a front wheel, the bicycle further having a frame and a handlebar stem extending from the handlebar to the frame, the handlebar further having a central portion, comprising:
a) a bicycle lock comprising a U-shaped shackle having a pair of ends, and a cross bar engagable with the ends for locking the lock; and
b) connection means for releasably fixing the lock to the handlebar and over the front wheel, the connection means releasably fixing the lock forwardly of both the handlebar stem and central portion of the handlebar whereby the lock may also be used for steering the bicycle.

13. The steering mechanism of claim 12, wherein the lock comprises a U-lock which comprises a U-shaped shackle with a pair of ends, and a cross bar engagable with the ends.

14. The steering mechanism of claim 12, wherein the connection means comprises quick release means for quickly securing the lock relative to the handlebar.

15. The steering mechanism of claim 12, wherein the connection means comprises tensioning means for maximizing the rigidity of the connection of the lock relative to the handlebar.

16. The steering mechanism of claim 12, wherein the connection means comprises shock absorbing means for minimizing vibrations transmitted from the handlebar.

17. The steering mechanism of claim 12, wherein the lock comprises tape wrapped in spiral fashion about at least a portion of the lock for gripping purposes and to provide the appearance of a conventional handlebar.

18. The steering mechanism of claim 13, wherein the connection means comprises means for engaging both the cross bar and U-shaped shackle.

19. A bicycle having a direction of travel, comprising:
a) a frame;
b) a pair of wheels connectable to the frame;
c) means on the frame for providing power to one of the wheels; and
d) a steering mechanism on the frame for steering the other wheel, comprising:
  1) a handlebar having a central portion;
  2) a U-lock comprising a U-shaped shackle with a pair of ends, and a cross bar engagable with the ends of the U-shaped shackle; and
  3) connection means for rigidly and removably connecting the U-lock to the steering mechanism, the connection means fixing the U-lock at a location forwardly of the central portion of the handlebar whereby the U-lock may be utilized to steer the bicycle.

20. A connector for connecting a U-lock to a handlebar of a bicycle, the U-lock comprising a U-shaped shackle with a pair of ends, and a cross bar engagable with the ends of the U-shaped shackle, the connector comprising:
a) handlebar connection means for connection to the handlebar of the bicycle; and
b) U-lock connection means attached to the handlebar connection means for connection to the u-lock such that the U-lock is connectable to the handlebar to steer the bicycle, the U-lock connection means comprising:
  1) a fixed clamping portion being fixed relative to the handlebar connection means;
  2) a swingable clamping portion being swingable relative to the fixed clamping portion via hinges;
  3) a pair of intersecting grooves formed between and by the fixed and swingable clamping portions, one of the grooves being transverse for engaging the cross bar, the other groove being longitudinal for engaging one of the ends of the U-shaped shackle; and
  4) quick release latch means between the clamping portions for quickly securing and releasing the clamping portions relative to each other to in turn quickly secure and release the U-lock to and from the connector.

21. The connector of claim 1, wherein the connector means mounts the cross bar forwardly of the central portion of the handlebar.

22. A bicycle accessory kit for attachment to the steering mechanism of a bicycle having a direction of travel, the steering mechanism having a first handlebar portion, the kit comprising:

a) a second handlebar portion comprising a U-lock which includes a U-shaped cylindrical shackle with a pair of ends and a cylindrical cross bar engagable with the ends;

b) bicycle tape wrapped about the U-shaped shackle to provide the shackle with an appearance of a conventional handlebar;

c) a pair of armrests for connection to one of the handlebar portions; and d) connection means for removably connecting the handlebar portions to each other and for orienting the second handlebar portion such that the U-lock lies generally horizontal, and such that the cross bar lies generally perpendicular to the direction of travel and rearwardly of the U-shaped shackle.

* * * * *